(12) United States Patent
Williams et al.

(10) Patent No.: US 6,763,042 B2
(45) Date of Patent: Jul. 13, 2004

(54) APPARATUS AND METHOD FOR FREQUENCY CONVERSION AND MIXING OF LASER LIGHT

(75) Inventors: Forrest L. Williams, Sandy, UT (US); Yuri S. Grapov, Sandy, UT (US); Dennis F. Elkins, Draper, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 116 days.

(21) Appl. No.: 10/017,162

(22) Filed: Dec. 14, 2001

(65) Prior Publication Data

US 2003/0112835 A1 Jun. 19, 2003

(51) Int. Cl.[7] ............................. H01S 3/30; H01S 3/10; H01S 3/13
(52) U.S. Cl. ................. 372/6; 372/20; 372/21; 372/22; 372/29.011; 372/28
(58) Field of Search ................ 372/20, 21, 6, 372/22, 26, 27, 29.011, 32, 28

(56) References Cited

U.S. PATENT DOCUMENTS

| | | | |
|---|---|---|---|
| 4,907,237 A | 3/1990 | Dahmani et al. | |
| 5,038,352 A | * 8/1991 | Lenth et al. | 372/21 |
| 5,095,491 A | 3/1992 | Kozlovsky et al. | |
| 5,111,468 A | 5/1992 | Kozlovsky et al. | |
| 5,159,601 A | 10/1992 | Huber | |
| 5,206,868 A | 4/1993 | Deacon | |
| 5,297,156 A | 3/1994 | Deacon | |
| 5,394,414 A | 2/1995 | Kozlovsky et al. | |
| 5,854,865 A | 12/1998 | Goldberg | |
| 5,912,740 A | 6/1999 | Zare et al. | |
| 5,946,129 A | 8/1999 | Xu et al. | |
| 5,974,059 A | * 10/1999 | Dawson | 372/6 |
| 6,021,141 A | 2/2000 | Nam | |
| 6,069,903 A | 5/2000 | Zanger et al. | |
| 6,175,579 B1 | 1/2001 | Sandford et al. | |

OTHER PUBLICATIONS

"Laser Phase and Frequency Stabilization using an Optical Resonator", R.W.P. Drever et al, Appl. Phys. B 31.97–105 (1983).
"Frequency Stabilization of Semiconductor Lasers for Applications in Coherent Communication Systems", Armin Sollberger et al, Journal of Lightwave Technology. vol. LT–5, No. 4, Apr. 1987.

* cited by examiner

Primary Examiner—Paul Ip
Assistant Examiner—Armando Rodriguez
(74) Attorney, Agent, or Firm—Thorpe North & Western, LLP

(57) ABSTRACT

A method and device for the nonlinear combination of laser light which produces a beam of uniform intensity, high spatial purity, and high conversion efficiency. The method includes emitting a laser light from a tunable distributed feedback fiber laser having both thermal and piezoelectric control elements which produces a laser light at a given frequency, wavelength, and intensity; converting the laser light in a nonlinear resonator which uses a nonlinear optical crystal for frequency conversion or mixing; and measuring the resonant frequency of the nonlinear resonator and adjusting the laser light frequency using both the thermal and piezoelectric elements of the fiber laser light source to match the resonant frequency conditions within the nonlinear resonator.

24 Claims, 3 Drawing Sheets

APPARATUS AND METHOD FOR FREQUENCY CONVERSION AND MIXING OF LASER LIGHT

BACKGROUND OF THE INVENTION

1. Field of the Invention

The present invention relates generally to frequency conversion of laser light from fiber lasers. More particularly, the present invention relates to a device for the frequency conversion and mixing of laser light using a thermally and piezoelectrically tuned light source and a ring resonator to provide dramatic improvement in the available frequency range, uniform output intensity, and high conversion efficiency.

2. Related Art

The phenomenon of frequency conversion in nonlinear crystals has been studied since the 1960s and has long been recognized as a candidate for generating visible laser light. P. A. Franken et al., Phys. Rev. Letters 128, 1761 (1962); D. A. Kleinman, J. Appl. Phys. 39,3597 (1968); and G. D. Boyd et al., J. Appl. Phys. 39 3597 (1968). Nonlinear crystals have the property of doubling the frequency of a portion of the input energy. Nonlinear crystals can also act to mix two input sources to produce an energy beam having a frequency that is either the sum or the difference of the input frequencies. Several authors have shown that the performance of nonlinear crystals is improved when the crystal is situated in a resonating geometry such that the light repeatedly passes through the crystal. There are certain resonant conditions within these resonators at which frequency conversion is a maximum.

Fiber lasers provide an excellent source of infrared energy for coupling in external conversion cavities. Fiber lasers can provide a simple source of high power, single mode infrared energy. U.S. Pat. No. 5,974,059 to Dawson et al. describes using a fiber laser as an energy source for a linear resonator for frequency doubling which produces a modulated output. Linear resonator configurations have the drawback of reflecting some of the energy back into the source, requiring efforts to prevent reflected energy from damaging the system.

Frequency stabilization of laser light systems provides desirable signal sources for a variety of applications. Commercial and industrial systems often require lasers having a narrow linewidth, i.e. narrow frequency spectrum, and long-term stability, i.e. reduced frequency drift. Numerous control techniques have been used to stabilize the frequency by providing cavity lock through matching the input frequency with the resonant frequency of the cavity.

Some techniques include providing a frequency reference, such as an atomic or molecular resonator. Such a system passes laser light through a cell containing a gas and collecting absorption information. An advantage of this type of scheme is the highly stable frequency reference cell. However there are significant drawbacks in reduced reliability and limited linewidth.

One frequency stabilization scheme is the Pound-Drever (PD) method. For more information see Drever et al., Appl. Phys. B 31, 97–105 (1983). This method uses a phase discriminant to control the cavity lock of the resonator. Most often the PD method is used to move a mirror within the external cavity using piezoelectric control to adjust the cavity length. Other applications of the PD method have adjusted the laser source frequency using piezoelectric control. Such control schemes provide good results at narrow linewidths, but often suffer from long-term instability of the laser frequency. Attempts at providing long-term stability and narrow linewidths have met with varying success.

SUMMARY OF THE INVENTION

Therefore, an apparatus and method for frequency conversion which provides uniform and stable frequency output at narrow linewidths over a broad range with long-term stability would be considered a significant advancement in the art.

It has been recognized that it would be advantageous to develop a method which efficiently converts infrared light to produce uniform high power visible laser light.

In one aspect of the present invention, a device is provided for the nonlinear combination of laser light comprising a tunable fiber laser light source which produces an energy beam along an optical path at a given frequency, wavelength, and intensity, and includes thermal and piezoelectric elements for providing adjustment to the frequency of the energy beam; a nonlinear resonator placed in the optical path of the energy beam; a nonlinear optical crystal disposed in the optical path of the energy beam within the nonlinear resonator; and a feedback system operatively connected to the nonlinear resonator and to the thermal and piezoelectric elements of the fiber laser light source. The combination is configured to adjust the frequency of the laser light source to match resonant frequency conditions within the nonlinear resonator.

In accordance with a more detailed aspect of the present invention, the device includes a nonlinear resonator having a ring configuration consisting of four mirrors. Each mirror of the nonlinear resonator is positioned at an angle which is non-normal. An additional feature of the nonlinear resonator involves the use of selectively or partially reflective mirrors which increase conversion efficiency.

In accordance with another more detailed aspect of the present invention, the device includes a feedback system which involves a Pound-Drever control scheme to adjust the frequency of the energy beam to match the resonant frequency of the external cavity. The feedback system includes a detector which is responsive to light emitted from the external cavity and is connected to a phase modulator placed in the optical path of the energy beam after the fiber laser light source, for modulating sidebands to the energy beam. The detector is also connected to a controller coupled to the thermal and piezoelectric elements of the laser light source for adjusting the frequency of the energy beam.

In accordance with yet another detailed aspect of the invention a polarization rotator is placed in the path of the energy beam after the tunable fiber laser light source and before the phase modulator. A power amplifier is connected to the optical path before the nonlinear resonator for amplifying the intensity of the energy beam. A second polarization rotator is also placed in the path of the energy beam after the power amplifier and before the nonlinear resonator.

Finally, in accordance with another aspect of the present invention, a second tunable laser light source is configured to emit an energy beam and disposed such that the first and second energy beams are resonantly coupled to the nonlinear resonator for frequency mixing.

Additional features and advantages of the invention will be apparent from the detailed description which follows, taken in conjunction with the accompanying drawings, which together illustrate, by way of example, features of the invention.

DETAILED DESCRIPTION

Figure 1:
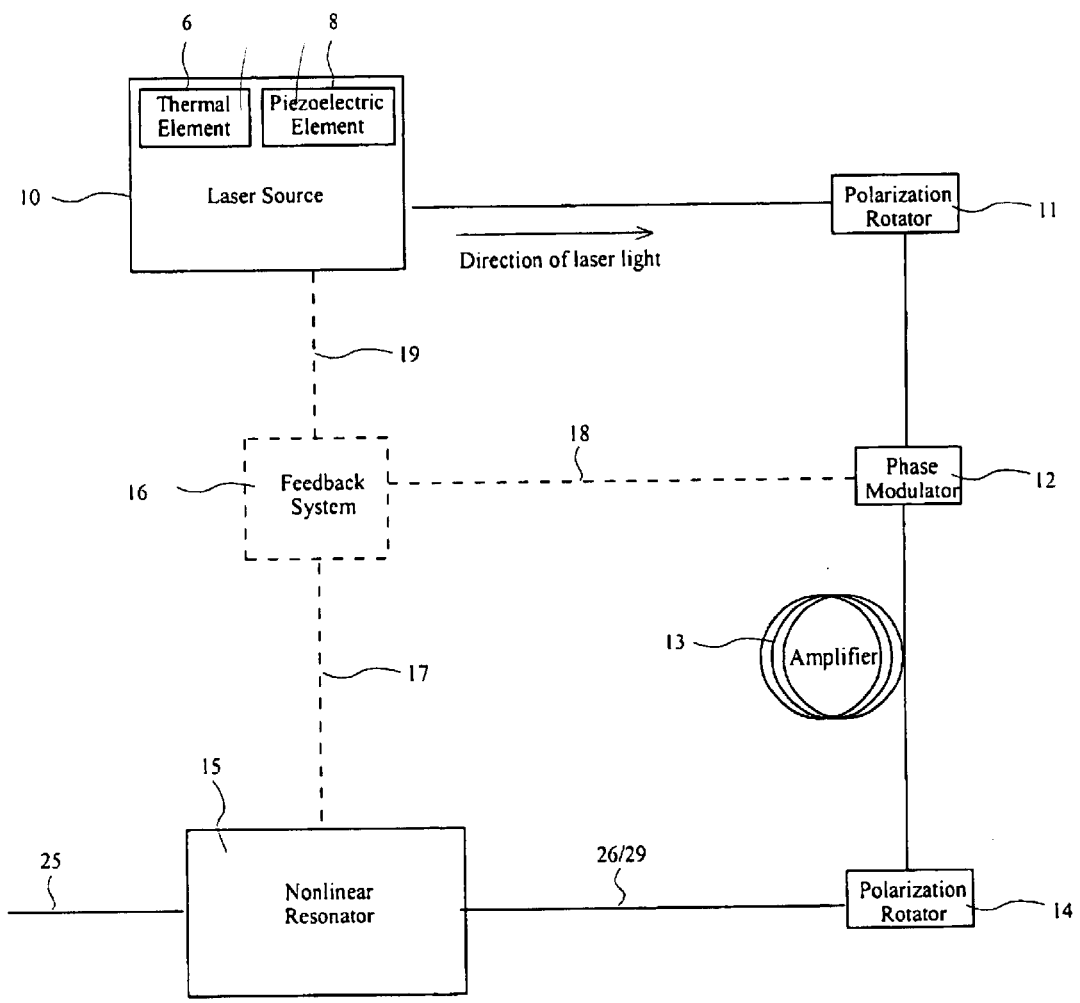
FIG. 1 is a schematic diagram of one embodiment of a device for conversion and/or mixing of laser light in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

In describing and claiming the present invention, the following terminology will be used.

As used herein, "nonlinear combination" refers to both "frequency conversion" and "frequency mixing" and involves the resonant nonlinear combination of light which includes Types I and II phase matching. Frequency conversion generally refers to the frequency conversion and doubling of a single light source. Frequency mixing generally refers to the resonant mixing and nonlinear combination of two separate light sources.

As used herein, "cavity" and "external cavity" refer to the space defined by the optical path within the nonlinear resonator. Thus, although the terms nonlinear resonator and cavity are similar the cavity is viewed as a part of the nonlinear resonator.

As used herein, "locking", "cavity lock" and the like refer to maintaining a pump frequency at the resonant frequency of an external cavity, which resonant frequency depends on a variety of factors such as crystal temperature, mirror reflectivities, mirror arrangement, and other factors known by those skilled in the art.

As used herein, "pump wavelength" refers to the wavelength of incoming light to the identified component. For example, when the nonlinear resonator and/or crystal are pumped, the wavelength referred to is the wavelength of light entering the nonlinear resonator and/or crystal, and which has not been combined.

As illustrated in FIG. 1, a system in accordance with one aspect of the present invention is shown for converting the frequency of laser light to produce a uniform high power visible light. The system provides a tunable fiber laser light source 10, which is doped with an optically active rare-earth element, usually a lanthanide, and is a distributed feedback fiber laser. The dopant selected depends on the desired wavelength and may include $Yb^{3+}$, $Er^{3+}$, $Nd^{3+}$, $Ho^{3+}$, $Tm^{3+}$, mixtures thereof, and other optically active elements or compounds. If a single mode fiber is used to construct the tunable fiber laser, a pure Gaussian beam is produced, i.e. a beam consisting of only the fundamental $TEM_{00}$ propagation mode. When used in the present invention, a distributed feedback (DFB) laser has several advantages over other laser light sources such as diode and other Fabry-Perot type lasers. DFB lasers provide narrower linewidth and a pure Gaussian beam, unlike typical Fabry-Perot lasers. Fiber lasers also provide a substantially uniform frequency, ease of frequency tuning, and high spatial beam quality.

An important aspect of the present invention is that the tunable fiber laser includes both piezoelectric (PZT) and thermal tuning elements for adjusting the output frequency. The thermal tuning is accomplished through taking advantage of thermal expansion and contraction effects within the fiber, which provide low-frequency wide-range tuning over a tuning range several orders of magnitude greater than what is achievable using only piezoelectric tuning. One way of heating the tunable fiber laser is to provide a resistive heating element which is in close proximity to the fiber. Other heating methods are well known in the art and are considered within the scope of this invention. The PZT tuning is accomplished using a piezoelectrically driven actuator, which is in mechanical contact with the fiber, which provides high-frequency fine-tuning. The piezoelectric effect is well known and generally involves applying an electric voltage to a responsive material. The material experiences mechanical strain as a result of the applied voltage which in turn may be configured to stretch and/or compress a length of the tunable fiber laser and thus effect the frequency of the resulting laser light.

The combination of thermal and PZT tuning provides a tunable laser source 10 capable of scanning the entire cavity resonance envelope, i.e. the region in frequency space over which the external cavity is resonant. One advantage of this tuning system is to avoid finding local output maximums and instead finding the optimal frequency which produces the maximum output for the given external cavity conditions. Another advantage of this tuning system is that while thermal tuning allows for a much greater bandwidth of operation, the PZT tuning simultaneously maintains the high-speed fine-tuning.

Figure 2:
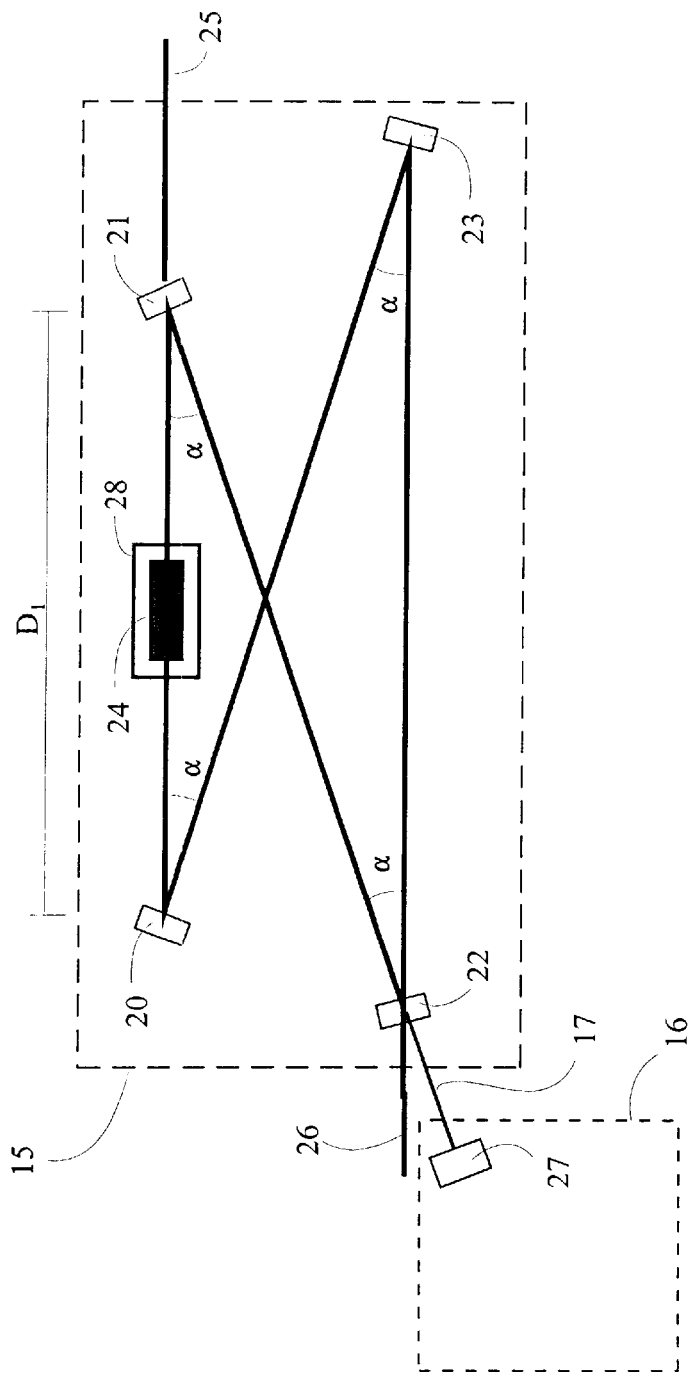
FIG. 2 is a schematic diagram of a non-linear resonator and detector in accordance with the present invention.

In another aspect of the present invention, the tunable fiber laser light source 10 is optically coupled to a nonlinear optical resonator 15, as shown in FIGS. 1 and 2. At least three reflective mirrors are placed within the resonant cavity such that the optical axis follows a folded path that is always at non-normal incidence to the cavity mirrors. The specific properties of the resonant modes within the cavity are determined by the types and placement of the mirrors that define the laser cavity, and the shape and refractive index of materials contained within the laser cavity and other factors understood by those skilled in the art. The most desirable stable resonator mode is the $TEM_{00}$ propagation mode. This mode is the lowest order transverse mode in a stable resonator and is described by a Gaussian intensity distribution. It can be focused to a small beam size and is therefore desirable for applications such as nonlinear optical conversion.

In the preferred embodiment shown in FIG. 1, the cavity is shown in a bow-tie configuration having four mirrors 20, 21, 22, and 23, although other nonlinear configurations such as rectangular and triangular could be used, and are considered to be within the scope of the present invention. One advantage of a nonlinear configuration is that the incoming laser light is reflected at an angle such that the laser light does not reenter the source laser 10 or other upstream equipment, either before or after entering the nonlinear resonator 15. This avoids possible damage to the source laser or other equipment and the need for optical isolators and the like, while increasing simplicity and efficiency of the frequency conversion process.

In the nonlinear resonator of FIG. 2, the mirrors have a particular geometry and reflectivity. One currently used embodiment of the resonator in FIG. 2 includes two spherical mirrors 20 and 21 both having a radius of curvature of 50 mm and separated by a nominal distance $D_1$ of 55 mm. The use of spherical mirrors 20 and 21 is desirable to produce a more stable mode in the resonator and serves to further focus the indicent light resulting in increased output intensities. Mirrors 22 and 23 are planar mirrors, which are separated by 125 mm. The diagonal distances between mirrors 20–23, and 21–22 are nominally 95.4 mm. The mirrors are each tilted from normal, with respect to the incident light path. The tilt angle a for the mirrors is limited by practical considerations such as light path clearances around components, polarization effects, and optical aberration. At angles greater than about 20°, the performance of the mirrors becomes very sensitive to polarization effects. In addition, at angles greater than about 15° optical aberrations such as astigmatism begin to degrade output beam quality. Thus, angles between 6° and 12° avoid these problems, with 10° being a useful tilt angle. Although the angles are shown as identical in FIG. 2 the angles need not all be the same. With the described configuration the cavity, without a crystal, pumped with 1064 nm light will stably resonate for a mirror distance $D_1$ between 50 and 59.4 mm.

A nonlinear crystal 24 is placed in the cavity halfway between mirrors 20 and 21. Alternatively, the nonlinear crystal could be placed between mirrors 22 and 23. However, this alternative placement may require using a spherical mirror as the input mirror 22, thus causing undesirable divergence of the reflected beam 17, which is discussed later in connection with the feedback system. Nonlinear crystals which may be used include, but are not limited to potassium niobate ($KNbO_3$), potassium titanyl phosphate (KTP), lithium niobate (LN), lithium potassium niobate, lithium iodate, potassium titanyl arsenate (KTA), barium borate, beta-barium borate (BBO). lithium triborate (LBO), and periodically-poled versions of these and similar crystals. Multiple crystals may be placed within the cavity along the light path, however such configurations increase the complexity and difficulty of maintaining resonant conditions within the external cavity. With a crystal present in the cavity, the stability range shifts due to an image shift affected by the refractive index of the nonlinear crystal. For example, when a 10 mm long KTP crystal is placed between mirrors 20 and 21 and pumped with light at 1064 nm, the stability range is between 54.2 and 63.7 mm.

With respect to one operable configuration the internal surfaces of mirrors 20, 21, and 23 may be coated with wavelength selective dielectric coatings that are highly reflective (R>99.5%) at the pump wavelength and highly transmissive (R<2.5%) at other wavelengths, particularly the converted wavelength. Herein, R is defined as the ratio of light reflected from the surface to the total incident light on the surface and "internal surface" refers to the mirror surface which is facing the internal cavity. The input mirror 22 is coated such that the internal surface is partially reflective (95%<R<99.5%) at the pump wavelength and highly reflective (R>99.95%) at the converted wavelength and other wavelengths. The external surfaces of each mirror are often coated for high transmission at the wavelengths for which the internal surfaces are transmissive.

Coating the mirrors in such a manner has several positive results. One advantage of this arrangement is that the converted light does not continue to resonate within the cavity, thus avoiding possible degradation (often referred to as the "green problem") and reduced conversion efficiency. Since mirrors 20, 21, and 23 are highly transmissive at the converted wavelength some of the converted light "leaks" through mirrors 20 and 23. However, when the nonlinear crystal 24 is placed between mirrors 20 and 21, over 90% of the converted light leaves the cavity through mirror 21. The output of converted laser light 25 has a very high spatial purity and uniform frequency such that complicated beam-forming or collimating optics are unnecessary.

The above geometries, reflectivities, and arrangements within the nonlinear resonator may vary considerably depending on the desired results, choice of non-linear crystal material, frequency control scheme, and source wavelengths, and may be adjusted by those skilled in the art through routine experimentation.

In accordance with a further aspect of this invention, a feedback system 16 as shown in FIG. 1 is provided to maintain resonant conditions within the cavity. One currently used control scheme involves the use of the Pound-Drever method of phase-discriminant control. A Pound-Drever scheme optically inserts sidebands into a laser beam by sending the laser source beam through a phase modulator 12 driven by a radio frequency (RF) source to produce two sidebands at the RF modulation frequency around the laser "carrier" frequency. To provide a strong locking signal, the sidebands are chosen outside of the external cavity resonance linewidth such that they are reflected from the cavity, i.e. at the external surface of the input mirror 22.

The feedback system 16 includes a detector 27 optically coupled to the input mirror 22 for detecting the resonant frequency of the external cavity and the reflected side bands. As a result of the nonlinear resonator configuration, the detector 27 is conveniently not in the path of the incoming laser light 26, further simplifying the feedback system. The portion of the laser beam reflected from the input mirror 22 of the cavity and the resonant frequency which "leaks" through the partially reflective input mirror 22 are measured using a standard square-law photodetector 27. Thus, it is preferable that the input mirror 22 be planar to reduce divergence of the reflected portion of the laser beam. The reflected beam and the leaked signal are collectively referred to as 17 in the figures for convenience. The reflected portion and the leaked signal are in antiphase with one another, therefore if the carrier frequency matches the resonant frequency of the external cavity, neither the carrier nor the sidebands will be phase shifted. However, if the carrier frequency does not exactly match the resonance frequency, the imbalance in the relative phase or reflection amplitude experienced by the sidebands results in a signal at the RF modulation frequency. The signal from the detector 24 is used in the feedback system to create a signal 18 to adjust the small sidebands introduced using a phase modulator 12. The signal from the detector 24 is also used in the feedback system to create a signal 19 to adjust the source laser 10 frequency via the PZT and thermal elements of the fiber laser light source 10 using a controller as part of the feedback system.

The controller may include single or multiple sub-components configured to control both the PZT and thermal elements in response to the signal from the detector. A mixer may be used to demodulate the reflected signal with the original RF source to produce an error signal for locking which is extremely sensitive to the external cavity resonance conditions. Thus, the PD feedback method involves using a phase discriminant to produce an error signal. This method provides absolute frequency lock of the cavity, with no fluctuations in the resonator output and is independent of intensity. The resulting feedback system allows for controllable and uniform output with no induced variation over a wide dynamic range. Use of an adequately fast PZT actuator reduces the noise sufficiently to produce an output which may be used for nearly any application that requires a true continuous-wave light source. For example, a prototype of this embodiment pumped at 1064 nm has demonstrated uniform output over the range of 50 mW to 5 W, having less than 0.25% "ripple" over a thirty-minute period. Thus, very little adjustment or realignment is necessary over wide ranges of power. Although the PD method is currently used, other control methods which provide similar results may be used, such as the more complex Hänsch-Couillaud method.

In order to aid in maintaining constant cavity resonance conditions, a temperature transducer 28 is used to carefully control the temperature of the nonlinear crystal 24. The nonlinear properties of the crystal 24 are extremely sensitive to temperature changes on the order of ±0.1° C. In one embodiment, the temperature transducer consists of a thermoelectric cooler that utilizes the Peltier effect to maintain the nonlinear crystal at a specified temperature over a wide range of pump powers.

Another feature of the present invention comprises using a power amplifier 13 to increase the output power of the tunable fiber laser 10 before the beam enters the nonlinear resonator 15. Many known fiber laser amplifier and coupling techniques would satisfy the present invention, however the currently used amplifier is a double-clad fiber amplifier which is coupled to the fiber carrying the energy beam using the side-coupling method of U.S. application Ser. No. 09/872,200, entitled "Multimode Coupler System" herein incorporated by reference. In one embodiment of the present invention the amplifier is pumped with 980 nm diodes, which are also coupled to the amplifier using the above mentioned side-coupling method and provides an approximate ten-thousand-fold increase in power. The method of the present invention does not require a power amplifier and will operate at nearly any power level, i.e. a few $\mu W$ to hundreds of Watts. Typical useful power ranges are between about 25 mW and 100 W. Useful power ranges also fall between about 50 mW and 10 W. However, the non-linear conversion efficiency within the external cavity increases quadratically with source power. Also, there is a minimum power at which no conversion would occur. In the embodiment described in this disclosure this minimum value is in the range of about 15 to 100 $\mu W$.

In keeping with the present invention, polarization rotators 11 are used to increase frequency conversion efficiency. Such polarization rotators may not be necessary if fiber lasers and amplifiers are used which are constructed from polarization maintaining (PM) fiber. The currently used polarization rotators are in-fiber rotators. Only laser light aligned to the ordinary and/or extraordinary axes of the non-linear crystal is converted. Using polarization rotators in this manner to properly align the incoming laser light increases the efficiency and output intensity of the laser conversion process. Polarization within common optical fibers is path-dependent, therefore affecting the plane of polarization. For this reason a polarization rotator 14 placed before the non-linear resonator is desirable. Further, a polarization rotator 11 may be placed before the phase modulator 12 along the path of the laser light. Currently, polarization sensitive phase modulators are used which require the use of a polarization rotator. Obviously, if a non-polarization sensitive phase modulator were used the polarization rotator would be unnecessary. It is anticipated that such phase modulators will eventually be available and use of such would clearly fall within the scope of the present invention.

In accordance with another aspect of the present invention, a polarization-maintaining (PM) optical fiber 29 carrying the input beam 26 may be fusion spliced to the output of the second polarization rotator 14 and used to transport the polarized laser light to preserve the preferred polarization orientation to the external cavity. The end of the PM optical fiber 29 may be cleaved, polished and optically coated so that the output may be coupled to the external cavity. Coupling to the external cavity may be efficiently accomplished using a single axial-gradient-refractive-index lens (not shown) that is adjusted using a multiaxis fixture (also not shown) that provides fine control over the lens position relative to the PM optical fiber end. Such a lens could also be used in the absence of a PM optical fiber. The high beam quality of the resulting incoming laser light to the nonlinear resonator provides an excellent laser light for frequency conversion.

The combination of the described embodiments routinely produces a uniform optical output at conversion efficiencies of over 25%. Conversion as high as 67% or greater has also been accomplished with the present invention as described.

Figure 3:
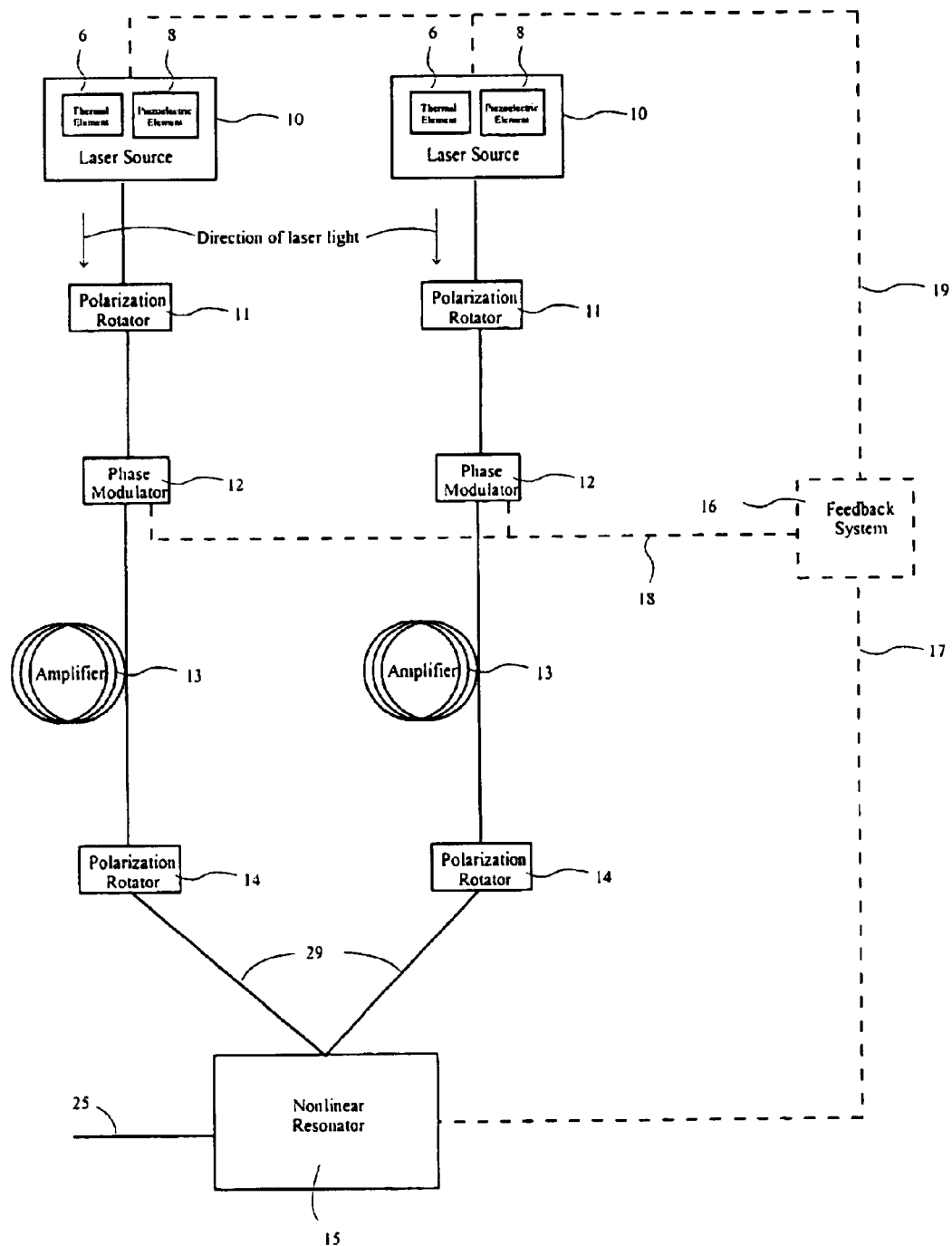
FIG. 3 is a schematic diagram showing two laser light sources each coupled to a non-linear resonator and detector for frequency mixing according to one aspect of the present invention.

In accordance with a further aspect of the present invention both frequency doubling and mixing may be accomplished. The use of a single pump source in the present invention results in doubling of the frequency and halving of the wavelength, i.e. 532 nm in the case of 1064 nm pump source. However, if two separate pump sources 10 are resonantly coupled to the nonlinear resonator, mixing of the laser light occurs. FIG. 3 shows a second laser light source 10 which is coupled to the nonlinear resonator 15 and the feedback system 16. Thus, it has been found that using only two laser sources can result in production of red, blue, and green visible laser light. For example, resonantly mixing 1550 nm (from a $Yb^+/Er^{3+}$ doped fiber) and 1064 nm light (from a $Yb^{3+}$ doped fiber), the resultant wavelength is 630.9 nm (red light). Also, doubling light at 1550 nm resulting in light having 775 nm wavelength and then resonantly mixing with 1064 nm light results in light having 448.4 nm wavelength (blue). Also, doubling light at 1064 nm results in light having 532 nm wavelength (green). Other useful sources include doubling of 1310 nm (from a $Nd^{3+}/Pr^{3+}$ or $Yb^{3+}/Er^{3+}$ doped fiber) or 980 nm (from an $Er^{3+}$ doped chalcogenide glass fiber) light to produce light having 655 nm and 490 nm wavelengths, respectively. The above recited wavelengths represent commonly used and readily available light sources. Other wavelengths within the range of about 400 to 1700 nm are also considered within the scope of this invention. The doubling and mixing within the present invention is very versatile and applies to both types of phase matching (Type I and Type II). Thus, using the uniform red, blue, and green light sources of the present invention in producing color laser displays would be desirable.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A device for the nonlinear combination of laser light comprising:
   a) a tunable fiber laser light source which produces a first energy beam along an optical path at a given frequency, wavelength, and intensity and includes thermal and piezoelectric elements for providing variable adjustment to at least the frequency of the first energy beam;
   b) a nonlinear resonator placed in the optical path of the first energy beam;
   c) a nonlinear optical crystal disposed in the optical path of the first energy beam within the nonlinear resonator for converting the frequency of the first energy beam; and
   d) a feedback system operatively connected to the nonlinear resonator and the thermal and piezoelectric elements of the fiber laser light source, said feedback system being configured to adjust the frequency of the laser light source to match resonant frequency conditions within the nonlinear resonator.

2. The device of claim 1, wherein the nonlinear resonator has a ring configuration and includes at least a first mirror located at a point of entry of the first energy beam to the resonator, a second, a third, and a fourth reflective mirror located within the nonlinear resonator wherein each mirror is positioned at an angle which is non-normal.

3. The device of claim 2, wherein an inside surface of the first reflective mirror is partially reflective at the wavelengths of the first energy beam and highly reflective at other wavelengths, and an inside surface of the second, third, and fourth reflective mirrors which are each highly reflective at the wavelengths of the first energy beam and highly transmissive at other wavelengths.

4. The device of claim 3, wherein an outside surface of the first reflective mirror is highly transmissive at the wavelength of the first energy beam.

5. The device of claim 1, wherein said fiber laser light source is a tunable distributed feedback laser light source.

6. The device of claim 1, wherein the feedback system further comprises a detector operatively connected to the nonlinear resonator and responsive to light within the resonator and a controller coupled to the laser light source and responsive to input from the detector for tuning the first energy beam via the thermal and piezoelectric elements.

7. The device of claim 6, further comprising a phase modulator placed in the optical path of the first energy beam after the fiber laser light source and before the nonlinear resonator, for modulating sidebands to the first energy beam and coupled to the feedback system in accordance with a Pound-Drever control scheme to adjust the frequency of the first energy beam via the controller.

8. The device of claim 7, further comprising a first polarization rotator placed in the path of the first energy beam after the tunable fiber laser light source and before the phase modulator.

9. The device of claim 1, further comprising a power amplifier operatively connected to the optical path before the nonlinear resonator, for amplifying the intensity of the first energy beam.

10. The device of claim 9, wherein the power of the converted energy beam from the nonlinear resonator is between about 25 mW and 100 W.

11. The device of claim 9, further comprising a second polarization rotator placed in the path of the first energy beam after the power amplifier and before the nonlinear resonator.

12. The device of claim 1, further comprising a temperature transducer operatively coupled to the nonlinear optical crystal, for controlling the temperature of the nonlinear optical crystal.

13. The device of claim 1, further comprising:
   a) a second tunable laser light source configured to emit a second energy beam along a second optical path at a given frequency, wavelength, and intensity and which includes thermal and piezoelectric elements for providing variable adjustment to at least the frequency of the second energy beam and wherein the first and second energy beams are resonantly coupled to the nonlinear resonator for frequency mixing; and
   b) wherein the thermal and piezoelectric elements of the second laser light source arc coupled to the feedback system to adjust the frequency of the second energy beam to match resonant frequency conditions within the nonlinear resonator.

14. The device of claim 13, wherein the first energy beam has a wavelength of approximately 1064 nm and the second energy beam has a wavelength of approximately 1550 nm.

15. The device of claim 13, wherein the first energy beam has a wavelength of approximately 775 nm and the second energy beam has a wavelength of approximately 1064 nm.

16. The device of claim 1, wherein the first energy beam has a wavelength between about 400 nm and 1700 nm and a power between about 50 mW and 10 W upon entering the nonlinear resonator.

17. The device of claim 16, wherein the first energy beam has a wavelength of approximately 1064 nm.

18. The device of claim 16, wherein the first energy beam has a wavelength of approximately 1310 nm.

19. The device of claim 16, wherein the first energy beam has a wavelength of approximately 980 nm.

20. The device of claim 1, wherein the nonlinear optical crystal is selected from the group consisting of potassium titanyl phosphate (KTP), potassium titanyl arsenate (KTA), lithium triborate (LBO), lithium niobate (LN), beta-barium borate (BBO), periodically-poled KTP, periodically-poled KTA, and periodically-poled LN.

21. A device for the nonlinear combination of laser light comprising:
   a) a tunable fiber laser light source which produces an energy beam along an optical path at a given frequency, wavelength, and intensity and includes thermal and piezoelectric elements for providing variable adjustment to at least the frequency of the energy beam;
   b) a nonlinear resonator, having four reflective mirrors, positioned along the optical path;
   c) a nonlinear optical crystal disposed in the optical path of the energy beam within the nonlinear resonator;
   d) a power amplifier operatively connected to the optical path before the nonlinear resonator, for amplifying the intensity of the energy beam;
   e) a first polarization rotator placed in the optical path after the laser light source and before the power amplifier and a second polarization rotator placed in the optical path after the power amplifier and before the nonlinear resonator;
   f) a feedback system operatively connected to the nonlinear resonator and the thermal and piezoelectric elements of the fiber laser light source using a Pound-Drever control scheme to adjust the frequency of the energy beam to match resonant frequency conditions within the nonlinear resonator, wherein the feedback system comprises a detector operatively connected to the nonlinear resonator and responsive to light within the resonator and a controller operatively coupled to the tunable fiber laser light source which is responsive to input from the detector for tuning the energy beam via the thermal and piezoelectric elements; and g) a phase modulator placed in the optical path of the energy beam before the amplifier and after the first polarization rotator, for modulating sidebands to the energy beam and coupled to the feedback system in accordance with the Pound-Drever control scheme.

22. A method for maintaining resonant conditions within a nonlinear resonator comprising the steps of:
   a) emitting a laser light from a tunable laser light source which produces the laser light at a given frequency, wavelength, and intensity, said laser light source including both thermal and piezoelectric tuning elements;
   b) modifying a physical parameter of the laser light in a nonlinear resonator having a nonlinear optical crystal operatively disposed therein; and
   c) measuring a physical parameter of the nonlinear resonator and adjusting at least one parameter of the laser light using both the thermal and piezoelectric elements of the tunable laser light source.

23. The method of claim 22, wherein the physical parameter of the laser light source and of the nonlinear resonator is frequency.

24. The method of claim 22, further comprising the step of introducing sideband signals to the laser light using a phase modulator placed before the linear resonator and wherein the step of measuring further comprises combining the resonant frequency and reflected non-resonant signals according to a Pound-Drever feedback control scheme, so as to produce signals to the phase modulator and the thermal and piezoelectric elements for adjusting the frequency of the laser light to match the resonant frequency.

* * * * *